Sept. 19, 1972   G. PRISLAN   3,692,508
PROCESS FOR THE MANUFACTURE OF FLAT GLASS
Filed June 15, 1970   3 Sheets-Sheet 1
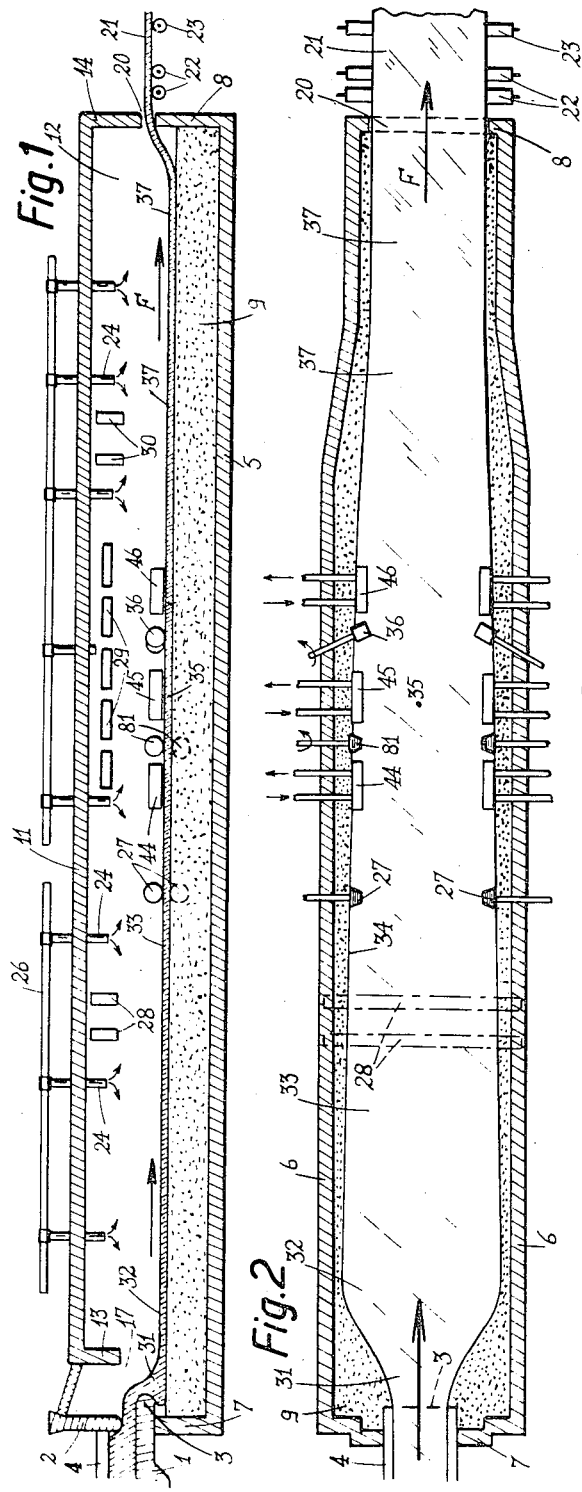
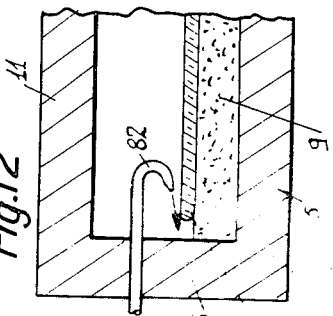
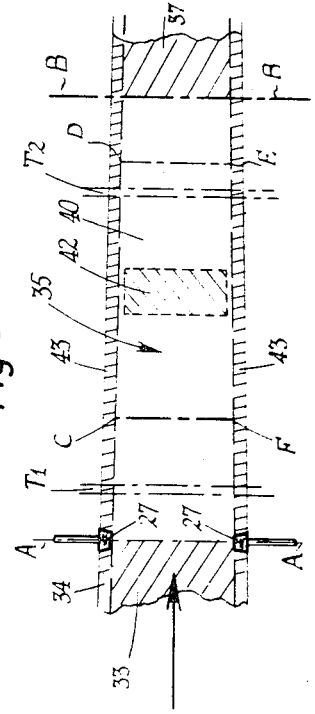
INVENTOR
GEORGES PRISLAN
BY Young & Thompson
ATTYS.

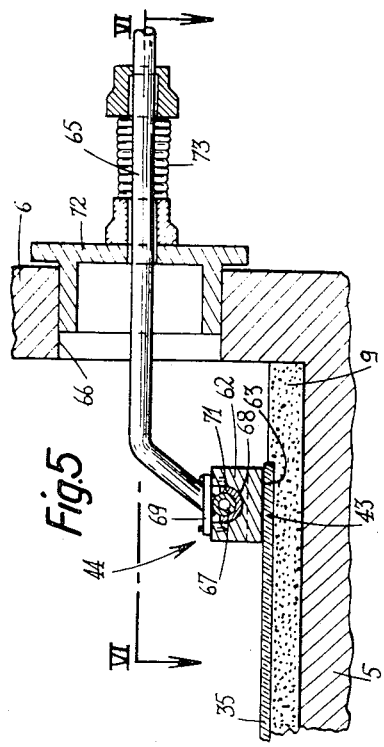
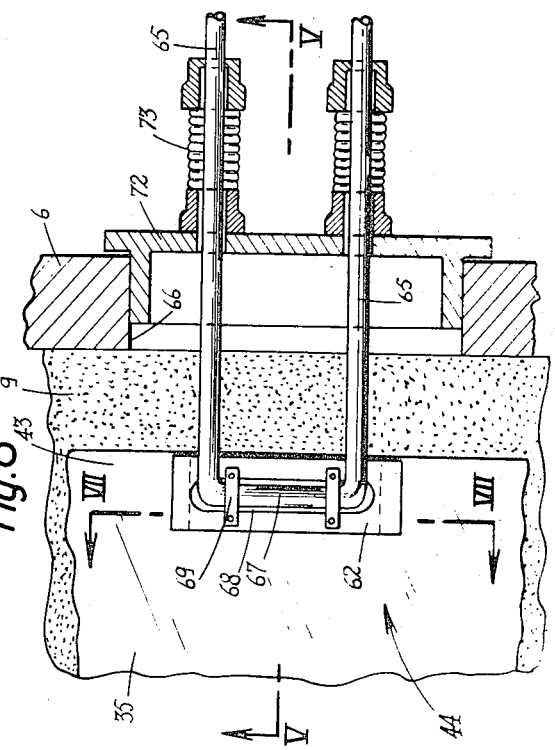
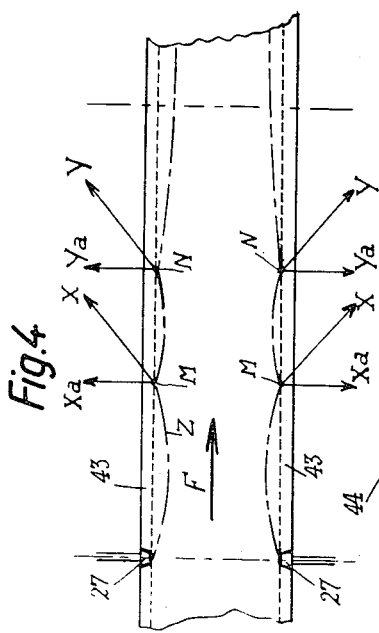
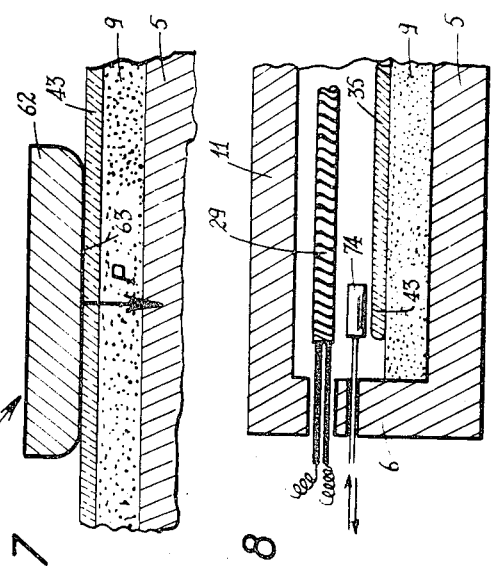

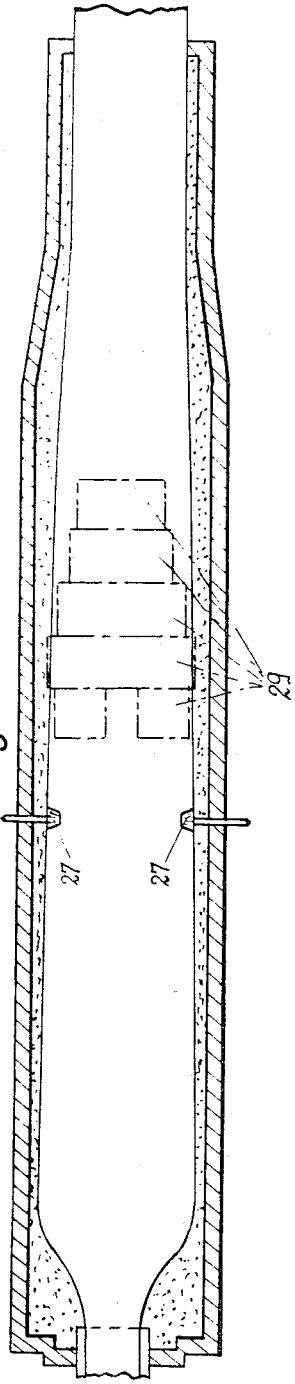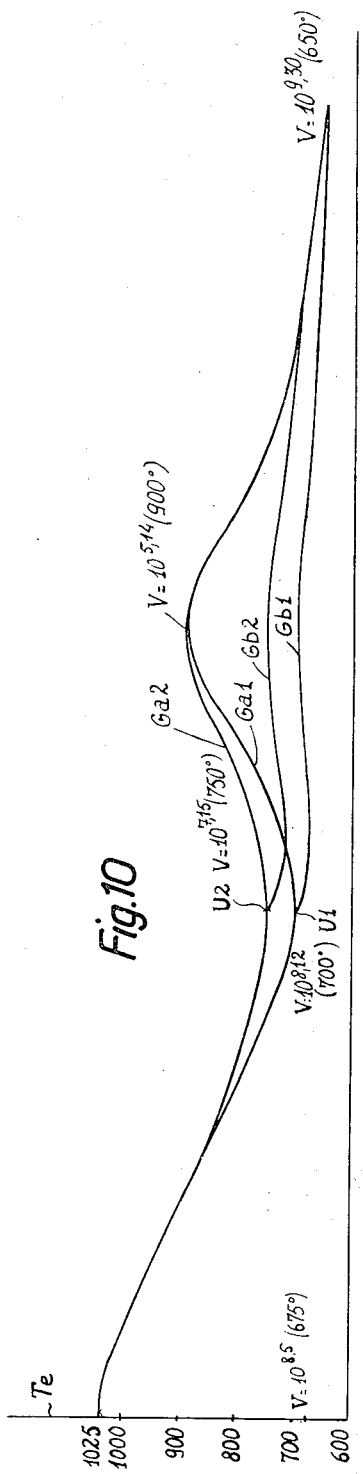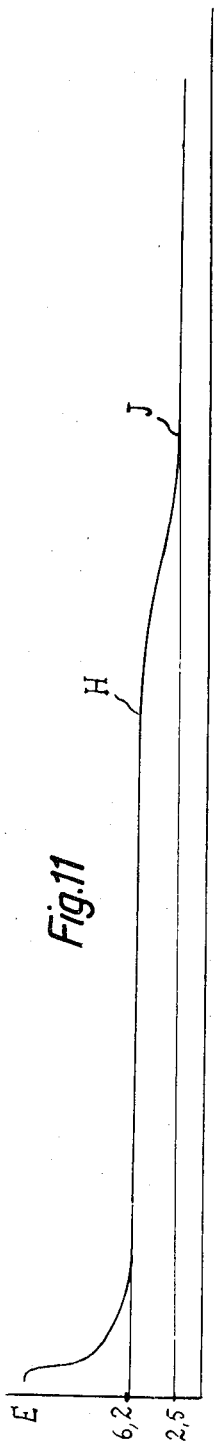

United States Patent Office 3,692,508
Patented Sept. 19, 1972

3,692,508
PROCESS FOR THE MANUFACTURE OF FLAT GLASS
Georges Prislan, Boussois, France, assignor to Boussois Souchon, Neuvesel, Paris, France
Filed June 15, 1970, Ser. No. 45,975
Claims priority, application France, July 1, 1969, 6922172
Int. Cl. C03b 18/00
U.S. Cl. 65—91                    1 Claim

ABSTRACT OF THE DISCLOSURE

Process for the manufacture of a fire-polished glass ribbon by longitudinal displacement thereof over the surface of a molten metal bath in which it is intended to obtain a predetermined thickness of smaller value than the glass-bath equilibrium thickness by gripping the edges of the ribbon in order to regulate the rate of displacement thereof along the bath, bringing the ribbon to a temporary plastic state and subjecting said ribbon to a longitudinal tractive force in order to produce acceleration and drawing-out, stabilizing the ribbon at the desired predetermined thickness and then cooling it in order to permit withdrawal from the bath. The ribbon having been gripped laterally while having a viscosity which is substantially within the range of $10^7$ to $10^8$ poises in the drawing zone located downstream of the gripping points, a transverse central band of the ribbon which is located between two edge bands is re-heated so that the viscosity of the central band should be at least forty times lower than that of the edge bands while maintaining the viscosity of said edge bands at a sufficiently low value to ensure that they are still capable of being drawn. It is thus possible to carry out a controlled extension of the glass ribbon in the drawing zone without thereby transmitting the tractive forces upstream of the edge-gripping rollers.

---

This invention relates to a process for the manufacture of a ribbon of flat glass by pouring molten glass onto a liquid bath (e.g. a tin bath) which has higher density than glass. This invention is more particularly directed to the continuous manufacture of a glass ribbon having a thickness which is smaller than the equilibrium thickness. This term designates the thickness which is assumed naturally by the molten glass in a state of equilibrium under the action of gravity forces and of the surface tension between the glass and the bath. In the case of the conventional float glass process (soda-lime glass on a molten tin bath), the equilibrium thickness is 6.2 mm.

It is known that a ribbon of glass having a thickness which is smaller than said equilibrium thickness is formed continuously on a liquid bath by subjecting the ribbon while this latter is maintained in or brought to the plastic state to forces which have the effect of drawing-out the gass either longitudinally or transversely or in both directions.

In a known drawing technique, the edges of the ribbon are gripped as this latter advances on the bath and is in a sufficiently rigid state by means of two pairs of knurled edge rollers or wheels which are placed in opposite relation; the ribbon is re-heated to a plastic state while being subjected to a longitudinal tractive force which accelerates its motion and results in a reduction in thickness; the ribbon is then allowed to set progressively at the desired thickness and when it is once again in a sufficiently rigid state, the ribbon is removed from the bath and conveyed on driving rolls into an annealing lehr; the portion of the ribbon which is thus displaced at a controlled speed exerts on that portion of the ribbon which is still floating on the bath a longitudinal tractive force which results in forward motion as well as drawing-out in the zone in which the glass is in the plastic state.

In this technique, the pairs of knurled wheels which grip the edges of the ribbon and displace this latter at a controlled speed constitute anchoring points which are capable of acting at least to a partial extent in opposition to the tractive or drawing force. Nevertheless, this force has a tendency to produce shrinkages of the ribbon in the drawing zone, with the result that the width of the glass which emerges from the bath is appreciably reduced and this is a major disadvantage. In order to overcome this difficulty, it has been proposed to exert transverse tensile forces on the edges of the ribbon in order to prevent these latter from moving closer together; the means proposed consist of pairs of knurled wheels or edge rollers which are placed opposite to each other and freely mounted or driven in rotation at a controlled speed and the axes of which are inclined relative to the direction of displacement of the ribbon.

However, it has been found by experience that the means referred-to above are not satisfactory in the case of thicknesses of glass which are distinctly smaller than the equilibrium thickness (less than 3 mm., for example, if the equilibrium thickness is 6.2 mm.).

It is in fact observed that the glass ribbon tends to escape either from the pairs of knurled wheels or edge rollers which are intended to prevent shrinkage or narrowing of the ribbon or even from the pair of knurled wheels which is placed farthest upstream within the installation in order to constitute anchoring points which are capable of acting in opposition to the drawing forces. In both cases, there is a danger of loss of control over the glass ribbon and this constitutes a serious production incident.

If a single pair of knurled wheels is provided at a point located at the far upstream end of the installation, it is found in the case of glass sheets of small thickness that the ribbon undergoes a reduction of its initial width of the order of 50%. This is a further disadvantage since it is necessary to reduce the glass flow rate in order to prevent an excessive cutting rate. This limits production and the annealing lehrs which are located downstream of the bath in any case operate at a very low level of efficiency.

In accordance with another known technique, the cooled glass ribbon is subjected when still in the plastic state to a longitudinal tractive force which draws-out the glass and the means for preventing narrowing of the ribbon consist of shoes, the underface of each shoe being provided with grooves which are parallel to the direction of forward motion of the ribbon. Said shoes exert on the glass ribbon a pressure which is capable of deforming the top face of the ribbon edges at least for a short time in order to cause these latter to conform to the shape of the grooves and thus to be guided in a direction parallel to these latter. The shoes are formed of refractory material which does not adhere to the glass and are usually cooled in order to prevent corrosion and facilitate positional maintenance of the ribbon edges with the desired relative spacing. It has also been proposed to form grooved shoes of porous material for interposing a gas film which reduces friction between the glass and the shoes as well as the danger of adhesion of the shoes to the glass.

The application of this technique is subject in particular to the following disadvantages: the friction forces between shoes and deformed top edges of the glass ribbon are low, especially if a fluid film is interposed between these latter and if the cooling produced by the shoes has resulted in setting of the impressions produced by these latter in the top face of each ribbon edge. Accordingly, the drawing force which becomes greater as glass sheets of smaller thickness are to be made is transmitted to the head or upstream end of the bath in which the ribbon in process of formation is still in a highly fluid state. This results in drawing-out of this portion of the ribbon which accordingly shrinks and the edges of which are no longer capable of penetrating beneath the shoes. On the contrary, if the shoes are cooled only to a slight extent in order to prevent the drawing force from being transmitted to the upstream end of the bath, the raised portions formed in the edges of the glass ribbon do not have sufficient viscosity to maintain a correct spacing of said edges with any degree of reliability. In both cases, there is therefore a potential danger of loss of control.

In a third known technique, the mass of molten glass having low viscosity is brought onto a molten metal bath over which the glass spreads so as to form a ribbon having a thickness which is the glass-bath equilibrium thickness; when the ribbon which is thus formed has attained a viscosity of more than $10^9$ poises, transverse re-heating of the ribbon is carried out in order to produce further softening (a viscosity of less than $10^7$ poises) except for its two edge zones which retain a high viscosity having a value substantially equal to $10^9$ poises; a tractive or drawing force is exerted at the same time and has the effect of producing a sheet of reduced thickness except at the edges where the thickness remains substantially equal to the thickness of the ribbon prior to drawing-out.

The first disadvantage of this process lies in the fact that the edges of the glass ribbon which is thus produced have very substantial overthicknesses which are the cause of fractures during operations involving annealing of the glass ribbon and which must be removed when sheets of commercial sizes are cut from the annealed ribbon. Moreover, the tractive force which is exerted in order to carry out the drawing operation is transmitted through the rigid edges to that portion of the glass ribbon which has not yet been subjected to transverse re-heating and the viscosity of which is higher than $10^9$ poises. This portion of the ribbon causes non-controlled drawing accompanied by substantial narrowing of the glass in the fluid state which is deposited at the upstream end of the bath.

This invention is intended to overcome the disadvantages of the techniques which have been outlined in the foregoing.

One essential object of the invention is to provide a process for the continuous manufacture on a tin bath of a glass ribbon which has a thickness of smaller value than the glass-bath equilibrium thickness and the width of which is reduced during the drawing-out operation only to a very small extent.

A further object of the invention is to provide a process for manufacturing a ribbon of this type in which the edge zones do not have appreciable overthicknesses with respect to the thickness of the central zone located between said edge zones, with the result that said ribbon can thus be subjected to the annealing operation under excellent conditions and that the edge zones which have to be removed at the time of cutting operations are of very small width.

The process according to the invention for the manufacture of a fire-polished glass ribbon by longitudinal displacement of said ribbon over the surface of a molten metal bath is intended to obtain a predetermined thickness of smaller value than the glass-bath equilibrium thickness by gripping the edges of the ribbon in order to regulate the rate of displacement thereof along the bath, bringing the ribbon to a temporary plastic, state and subjecting said ribbon to a longitudinal tractive force in order to produce acceleration and drawing-out, stabilizing said ribbon at the desired predetermined thickness and then cooling in order to permit withdrawal from the bath and is distinguished by the fact that, the ribbon having been gripped laterally while having a viscosity which is substantially within the range of $10^7$ to $10^8$ poises in the drawing zone located downstream of the gripping points, a transverse central band of the ribbon which is located between two edge bands is re-heated so that the viscosity of the central band should be at least forty times lower than that of said edge bands while maintaining the viscosity of these latter at a sufficiently low value to ensure that they are still capable of being drawn.

In a preferred form of execution of the invention, steps are taken to ensure that the viscosity is maintained at a value which is substantially with the range of $10^{3.5}$ to $10^7$ poises in the central band of the drawing zone whereas the viscosity is maintained at a value which is substantially within the range of $10^7$ to $10^{8.5}$ poises in the edge bands.

The above-mentioned choice of viscosities makes it possible to carry out a controlled extension of the glass ribbon in the drawing zone without thereby transmitting the tractive forces upstream of the edge-gripping rollers or knurled wheels.

In a particular embodiment of the method which is intended to achieve a further reduction and even elimination of the transverse shrinkage to which the glass is subjected during the drawing operation, the application of the longitudinal horizontal drawing force is combined with the application of tractive forces which are developed transversely with respect to the ribbon and the points of application of which are located in the edge zones of the ribbon while this latter is in the plastic state and during reduction in thickness in the drawing zone.

The installation for the manufacture of a fire-polished glass ribbon comprises in known manner an elongated tank containing a molten metal bath with an inlet for the molten glass and an outlet for the glass ribbon; means for delivering to the inlet a ribbon of molten glass which spreads to the limit of its free flow; temperature regulators which permit gradual cooling of the molten glass; means for gripping the edges of the ribbon which has thus been cooled; means for re-heating the ribbon after this latter has been gripped and thus putting it in a temporary plastic state; means for applying a longitudinal tractive force to the ribbon in said plastic state in order to draw-out and reduce the thickness of said ribbon to a predetermined value which is lower than the glass-bath equilibrium thickness; temperature-regulating means for cooling the ribbon which has thus been drawn; means for withdrawing the ribbon from the bath. In accordance with the invention, said installation is distinguished by the fact that the means for re-heating the ribbon which are located downstream of the gripping means are so arranged as to carry out differentiated transverse re-heating of the glass ribbon in the drawing zone.

In an advantageous embodiment of the invention, the means for differentiated transverse re-heating of the ribbon are combined with means for thermal regulation of the edge bands.

In a preferred embodiment of the invention, the means for thermal regulation of the ribbon edge bands comprise heat-absorption means which can be adjusted so as to maintain the viscosity of said zones within the range of values established in the method according to the invention.

Said heat-absorption means comprise fluid-cooled surfaces which are adjustably mounted on the side walls of the tank at a small distance from or in contact with either all or part of said edge bands above the edges of the ribbon and/or below, within the bath, and/or laterally. Said heat-absorption means are preferably constituted by shoes which are cooled by a circulation of fluid. The underfaces of said shoes are substantially flat, do not adhere to the glass and are located at a short distance from the top portion of the edges of the glass ribbon or in contact with these latter; a pressure can be exerted by the shoes on the edges of the ribbon in order to improve thermal contacts.

In another embodiment of the invention, the heat-absorption means comprise cylindrical or conical rollers whose smooth external surface does not adhere to the glass with which said rollers are in contact and which are cooled by an internal flow of fluid; said rollers can be freely mounted or driven in rotation.

In another form of construction which can be combined with the means mentioned in the foregoing, the means for thermal regulation of the edge zones of the ribbon are constituted by jets of cooling fluid which are directed against the edges of the ribbon and preferably slantwise, that is to say downwards at the same time as towards the tank wall which is nearest to the edge zone being treated; this arrangement makes it possible not only to cool the edges of the ribbon but also to exert a transverse tractive force on said edges in order that, when the opposite edges are treated simultaneously, shrinkage of the ribbon during reduction in thickness of this latter accordingly prevented.

In order to carry out the method of the invention and when it is desired to achieve a further reduction and even elimination of the transverse shrinkage to which the glass ribbon is subjected during drawing-out, provision is also made between some of the means for thermal regulation of the edge bands of the ribbon for edge rollers or knurled wheels of known type and having a slightly inclined axis which are either freely mounted or driven in rotation; when they are provided with internal cooling, said means additionally constitute means for thermal regulation of the edge zones of the ribbon.

In the accompanying drawings which are given by way of non-limitative example:

FIG. 1 is a diagrammatic longitudinal sectional view of an installation arranged in accordance with the invention;

FIG. 2 is a corresponding plan view of the above-mentioned installation after removal of the roof of this latter;

FIG. 3 is a diagrammatic view of the portion of ribbon which is being subjected to the drawing operation;

FIG. 4 is a view of the ribbon during drawing when this latter is subjected to the action of transverse tractive forces;

FIG. 5 is a view in elevation on a larger scale and in cross-section along line V—V of FIG. 6 showing the installation described in FIGS. 1 and 2 at the level of a device for thermal conditions of an edge band;

FIG. 6 is the corresponding sectional plan view taken along line VI—VI of FIG. 5;

FIG. 7 is a sectional view along line VII—VII of FIG. 6;

FIG. 8 is a partial sectional view of the bath at the level of a cooler of a particular type which forms a heat shield for an edge zone of the ribbon;

FIG. 9 is a diagrammatic plan view of the tank;

FIG. 10 is a diagram of temperatures along the glass ribbon and corresponding to FIG. 9;

FIG. 11 is a diagram of the thicknesses of the glass ribbon and corresponds to the two previous figures.

Referring in particular to FIGS. 1 and 2 of the accompanying drawings, the structure and operation of an installation which is known per se and to which the invention applies will first be recalled.

In these figures, the forehearth of a furnace for continuous melting of glass is shown at 1 and the feeder gate or tweel for regulating the glass flow is shown at 2. The forehearth 1 has an extension in the form of a spillway comprising a lip 3 and lateral uprights 4 which endow the spillway with a generally rectangular transverse sectional shape.

The spillway overhangs the bottom of a tank 5 having side walls 6 which are joined to each other by end walls 7 and 8. The tank 5 contains a bath 9 of molten metal such as tin or tin alloy having a specific gravity which is higher than that of the glass. The tank 5 supports a roof having a crown 11, side walls 12 and end walls 13 and 14 forming respectively the inlet and outlet ends of the bath. The roof thus constitutes a tunnel above the bath.

The molten glass passes into the tank 5 through an inlet 17 formed between the underface of the end wall 13 and the bottom of the tank 5.

The underface of the end wall 14 of the crown 11 defines with the end wall 8 of the tank 5 an outlet 20 for the final glass ribbon 21 which has the desired thickness and which is delivered from the bath.

Driving rolls 22 which serve as feed rolls are mounted downstream of the outlet 20 and slightly above the edge of the wall 8. Further driving and conveying rolls 23, only one of which is illustrated, are located within an ordinary tunnel lehr (not shown) in which the ribbon 21 is annealed and are adapted to cooperate with the rolls 22 in order to exert a tractive force F on the ribbon 21. Under this action, the glass ribbon which floats on the surface of the bath 9 is displaced towards the outlet 20, moves upwards out of the bath and onto the rolls 22 and 23, passes on through the tunnel lehr and upon emerging from this latter is cut into primary sheets having the desired dimensions.

The crown 11 carries spaced tubes 24 connected to feed pipes 26 through which a shield gas is supplied. Said gas is thus passed above the tank 5 in order to produce an atmosphere which does not react chemically with the metal of the bath. The surrounding air is thus prevented from penetrating into the interior through the inlet 17 and outlet 20.

At a distance of the order of ⅗ of the length of the tank 5 as measured from the inlet 17 of the bath, provision is made on each side of the bath and in oppositely facing relation for two pairs of grooved or knurled cone-wheels 27 of known type which do not adhere to the glass and are cooled by an internal circulation of water, said knurled wheels being driven in rotation at an adjustable speed by motors which are placed outside the bath and have not been illustrated; said knurled wheels 27 are adapted to grip the edges of the ribbon which is being formed. Transverse water-circulation coolers 28 are located close to and upstream of the pairs of knurled wheels; in addition, electric radiators 29 which are fixed beneath the crown 11 of the bath are placed downstream of the pairs of knurled wheels 27 in a zone which extends over approximately one-quarter of the length of the bath and which is clearly shown in FIG. 9. Beyond this zone and in the direction of the outlet 20 of the bath, water coolers 30 of a known type are placed across the bath.

The mass 31 of molten glass arrives over the spillway at a flow rate which is regulated by means of the tweel 2, passes through the inlet of the bath 17 and is discharged at the head or upstream end of this latter at a temperature of the order of 1,025° C.; the glass spreads up to the limit of its free flow under the action of forces of gravity and of surface tension. At this moment, the mass of glass acquires at 32 an equilibrium thickness of the order of 6.2 mm. in the case of soda-lime glass on a molten tin bath. The glass mass cools either naturally or under the action of the coolers 28 while moving forward in the direction F in the form of a ribbon 33 which becomes progressively more rigid.

The edges 34 of the ribbon 33 are then gripped between the pairs of edge wheels 27 which displace the formed ribbon as they carry out a movement of rotation and at the same time constitute an obstacle which is capable of affording resistance to the transmission of acceleration forces to the mass 31 of molten glass, said forces being applied longitudinally by the feed-rolls 22 and 23.

The ribbon is then re-heated in the zone 35 (shown in (FIG. 3) in order to be brought to a transient plastic state by means of heat radiators 29; at the same time, the feed-rolls 22 and 23 exert a longitudinal tractive force which draws-out the ribbon in its portion 35 and thus results in a reduction both in thickness and in width.

A thinned ribbon of predetermined thickness can be obtained by regulating the speed of rotation of the rolls 22 and 23 as well as by adjusting the coolers 28.

In order to guard against shrinkage of the ribbon, rollers or pairs of knurled wheels 36 which are placed in opposite relation, which have an oblique axis of rotation and which tend to draw the ribbon edges away from each other can be employed in the zone in which the ribbon is thinned-down.

The thinned ribbon sets at 37 progressively at the desired thickness by natural cooling or by means of coolers 30 which are placed across the bath; when its temperature has fallen below 620° C., the ribbon is moved out through the opening 20 by means of the rolls 22 and is passed over the rolls 23 into the annealing lehr (not shown in the drawings).

According to the process of the invention, the edges 43 of the glass ribbon 33 (shown in FIG. 3) are gripped by the pairs of knurled wheels 27 while the glass has a viscosity V within the range of $10^8$ to $10^7$ poises, that is to say in the case of a soda-lime glass commonly employed in the type of manufacture which is described, when its temperature is within the range of 700 to 750° C. A differentiated transverse thermal treatment is applied correlatively to the ribbon 33 in the drawing zone which is located between the straight line A—A which is located in the axis of the knurled wheels 27 and the straight line B—B which is located at the level of the coolers 30. This treatment consists in re-heating by means of the radiators 29 a central transverse band 40 of the ribbon as defined by the quadrilateral CDEF while said ribbon is advancing between the lines A—A and B—B in order that its viscosity should decrease to less than $10^7$ poises (a temperature of soda-lime glass which is higher than 750° C.). In the example of regulation which is described, this viscosity decreases to $10^{5.14}$ poises (temperature attained:900° C.) at least in the cross-hatched region 42 which is located within the central band CDEF.

At the same time, the edge bands 43 of the band 40 which are located outside the cross-hatched region 42 and the width of which is smaller than approximately 20 cm. are subjected to a heat treatment. This treatment has the effect of maintaining the viscosity of the bands 43 within any unitary transverse section $T_1$ or $T_2$ which is subjected to a drawing operation at a higher value than the viscosity of that portion of the section considered which forms part of the central band 40. In accordance with the invention, the ratio of viscosity of the above-mentioned edge bands to the viscosity of the central band of a single section is maintained at a value which is either higher than or equal to 40. However, the viscosity of the edge bands 43 is maintained at a value which is lower than $10^{8.5}$ poises (temperature higher than 675° C. in the case of the glass considered), the edge bands 43 being still drawable at this value of viscosity.

When carrying out the process according to the invention, it is found that the shrinkage or in other words the reduction in width of the ribbon in the drawing zone between the lines A—A and B—B is considerably less than the shrinkage resulting from the application of known processes which consist in re-heating the sheet transversely without applying any differentiated thermal treatment to the edge zones.

It is also found in the application of the process according to the invention that there is an effective reduction in thickness of the ribbon and that the edge bands are drawn at the same time as the central band of the ribbon but without exhibiting any appreciable overthickness with respect to the central band on completion of the drawing operation.

Finally, the tractive force which is stopped by the knurled wheels 27 is not transmitted to the head of the bath even in the case of high drawing forces. Temperature variations both in the direction F and in the transverse direction are clearly shown in the diagram of FIG. 10 which corresponds to the plan view of FIG. 9 in which the heating means 29 as well as the knurled wheels 27 are shown diagrammatically.

In FIG. 10, the temperatures Te of the glass ribbon have been plotted as ordinates and the positions along the bath corresponding to FIG. 9 have been plotted as abscissae.

There are shown at $U_1$, $U_2$ the points at which the glass is gripped by the knurled wheels at two particular temperatures, namely 700° C. and 750° C. respectively. There is also shown the temperature difference between the central portion (curves $Ga_1$, $Ga_2$) and the edges (curves $Gb_1$, $Gb_2$). The curves then meet again downstream.

FIG. 11 shows the variation in thickness E of the glass ribbon. It is apparent that the drawing zone proper between the points H and J is displaced downstream with respect to the heating zone as defined by the radiators 29.

The invention thus makes it possible to obtain glass having the quality of plate glass, the thicknesses of which can be as small as 1 millimeter. Very advantageous and extensive commercial outlets are open to glasses of this type.

The favorable results which are thus obtained can be explained as follows although this explanation cannot be considered to form part of the invention.

A portion of ribbon in the plastic state is formed within the quadrilateral CDEF, is preceded at 33 and followed at 37 by rigid portions; the portion 33 is gripped by the edge rolls 27; the portion 37 produces a drawing action on the plastic portion 35 by reason of the fact that the rate of displacement of portion 37 is set by means of the feed-rolls 22 and 23 at a higher value than that of the portion 33 which is displaced by means of the knurled wheels 27.

The edge bands 43 which are relatively rigid with respect to the center of the ribbon are mainly subjected to the tractive force exerted by the portion 37 of the ribbon which has become rigid. In consequence, said bands which are retained by the knurled wheels 27 remain in a state of relative tension and thus afford resistance to the transverse stresses applied to said bands by the central portion of the ribbon. The edge bands which are subjected to the main drawing force and the viscosity of which is maintained at a relatively high value are in turn drawn and substantially thinned-down in the same proportions as the center of the ribbon.

The ribbon which has thus been drawn undergoes a certain amount of shrinkage but this latter is considerably smaller in extent than the shrinkage undergone when techniques of the prior art are employed. In order to reduce and even eliminate shrinkage, it is intended in accordance with the invention (as shown in FIG. 4) to apply substantially horizontal forces X, Y to the edge bands themselves, said forces having their point of application within these zones at M and N and having a component Xa, Ya which is directed towards the exterior of the ribbon. It is apparent that the shrinkage of the ribbon in the portion 35 of this latter which is subjected to the drawing process can be reduced to zero: the components of forces Xa, Ya tend to maintain in spaced relation not only their points of application such as M or N but also the edge bands 43 themselves by reason of their relative rigidity.

This arrangement offers a very great advantage over the prior art technique since, in this technique, the ribbon shrinks between the points of application of the transverse forces so as to have the configuration shown at Z in chain-dotted lines in FIG. 4. When the temperature of re-heating of the ribbon and the tractive or drawing force are of high value as is necessary in order to obtain a substantial reduction in thickness of the ribbon, there was no possibility in the prior art of controlling the ribbon by means of the devices provided for producing lateral tensile forces and even by means of the pairs of knurled wheels 27 and this carried the penalty of a major production incident.

In accordance with one embodiment of the invention, the means for thermal regulation of the edge bands 43 are constituted as shown in FIGS. 1 and 2 by two groups of coolers 44, 45, 46 placed in opposite relation above the edge bands 43, the flat underfaces of said coolers being in contact with the top faces of the edges of the ribbon and cooled by a fluid such as water. Said coolers are attached to the walls 6 of the bath in a stationary but adjustable position; moreover, they exert a slight vertical pressure on the edges of the ribbon which are urged upwards as a result of the hydrostatic pressure of the bath 9. The thermal contact between the coolers and the edges of the ribbon is thus enhanced.

The coolers of each group can be arranged in spaced relation (as shown in FIGS. 1 and 2) or even juxtaposed, depending on the intensity of cooling which it is necessary to apply to the edge bands 43.

Referring to FIGS. 5, 6 and 7, examples of construction of the coolers 44, 45 and 46 which are provided by the invention will now be described.

Each cooler such as the cooler 44, for example, comprises a substantially parallelepipedal shoe 62 formed of material which cannot be wetted by the glass such as carbon, for example, said shoe being 50 cm. in length and 15 cm. in width and having a flat underface 63 terminating in two rounded edges. The shoe 62 is oriented in the direction of its greatest length parallel with, above and in contact with the edge band 43 of the ribbon 35.

The shoe 62 is supported by a U-shaped tubular frame formed of heat-resisting steel, for example, through which can be circulated a cooling liquid such as water.

Said frame comprises two parallel arms 65 which traverse the wall 6 through an opening 66 and are joined to each other by means of a transverse arm 67 which is housed within a longitudinal groove 68, said groove being hollowed-out in the top portion of the shoe 62.

The arm 67 is welded to two straps 69 of heat-resisting steel which are bolted to the carbon shoe 62 and the space formed between the arm 67 and the groove 68 is filled with a substance 71 having good heat conductivity such as tin which assists heat transfer processes between the shoe 62 and the cooling liquid.

The arms 65 of the tubular frame support the shoe 62 through the opening 66 by means of leak-tight wall bushings comprising a heat-resisting shield plug 72 which is inserted in said opening and adapted to carry extensible bellows seals 73, the extremities of which are respectively secured to the shield plug 72 and to the arms 65.

The tubular frame 65-67 is supported externally of the tank 5 by means of structural assembly (not shown) of the type described in U.S. patent application Ser. No. 787,975 filed Dec. 30, 1968, which serves to adjust the position of the shoe 62 as well as the pressure P (FIG. 7) exerted on the edge band 43 of the ribbon by the underface 63 of said shoe.

In combination with the means 44, 45 and 46 for the thermal regulation of the edge bands 43, it is possible in accordance with the invention to employ known means for producing mechanical action on said bands in order to apply transverse forces which tend to maintain them at a constant distance from each other. Use will accordingly be made of rollers having an oblique axis such as the rollers 36 and/or pairs of knurled wheels such as the wheel 81 (FIGS. 1 and 2) of the same type as those which are shown at 27. These mechanical means for retaining the glass ribbon in the drawing zone can advantageously be interposed between the thermal regulating means 44, 45 or 46.

Although there have been described in the foregoing coolers 44, 45 and 46 which exert a light pressure by means of their bottom faces on the edge zones with which they are in contact, it would not constitute any departure from the invention to maintain said coolers or only some of these latter directly above said edge zones but at a distance from these latter without being in physical contact therewith.

For example, in FIG. 8, a water-cooling box 74 whose position is adjustable with respect to the wall 6 of the tank 5 is interposed parallel to the glass ribbon 35 between the electric heating device 79 which serves to re-heat said ribbon and the edge band 43 of this latter; said water box 74 produces a heat shield effect between the heating device 79 and the edge band 43 as well as a cooling action on said zone by radiation.

Another means for cooling the edge bands 43 is shown in FIG. 12 and consists in employing an array of tubes 82 which are inclined towards the walls 6 and directed towards the downstream end of the bath 9. Said tubes are suitably cooled and deliver a stream of inert gas onto the edge bands 43. This stream also produces an oblique tractive force such as X or Y (shown in FIG. 4) which prevents shrinkage of the ribbon.

I claim:

1. In a process for the manufacture of a fire-polished glass ribbon by longitudinal displacement of said ribbon over the surface of a molten metal bath to obtain a predetermined thickness of smaller value than the glass-bath equilibrium thickness, comprising the steps of gripping the edges of the ribbon to regulate the rate of displacement thereof along the bath, bringing the ribbon to a temporary plastic state and subjecting said ribbon to a longitudinal tractive force in order to produce acceleration and drawing-out, stabilizing the ribbon at the desired predetermined thickness and then cooling the ribbon to permit withdrawal of the ribbon from the bath; the improvement comprising reducing transverse shrinkage of the ribbon by gripping the ribbon laterally while the ribbon has a viscosity which is substantially within the range of $10^7$ to $10^8$ poises, and in the drawing zone located downstream of the gripping points reheating a transverse central band of said ribbon which is located between two edge bands to a temperature substantially higher than the temperature of said two edge bands so that the viscosity of said central band is at least forty times lower than the viscosity of the edge bands and substantially within the range of $10^{3.5}$ to $10^7$ poises while the viscosity of the edge bands is substantially within the range of $10^7$ to $10^{8.5}$ poises to ensure that said edge bands are still capable of being drawn.

References Cited

UNITED STATES PATENTS

| | | | |
|---|---|---|---|
| 3,589,886 | 6/1971 | Montgomery | 65—182 R |
| 3,301,651 | 1/1967 | Long | 65—99 A X |
| 3,486,869 | 12/1969 | Alonzo et al. | 65—182 X |
| 3,563,720 | 2/1971 | Ito et al. | 65—182 R |
| 3,353,943 | 11/1967 | Loutte | 65—182 R |
| 3,440,030 | 4/1969 | Thompson et al. | 65—182 R |

ROBERT L. LINDSAY, Jr., Primary Examiner

U.S. Cl. X.R.

65—99 A